Patent cover page …

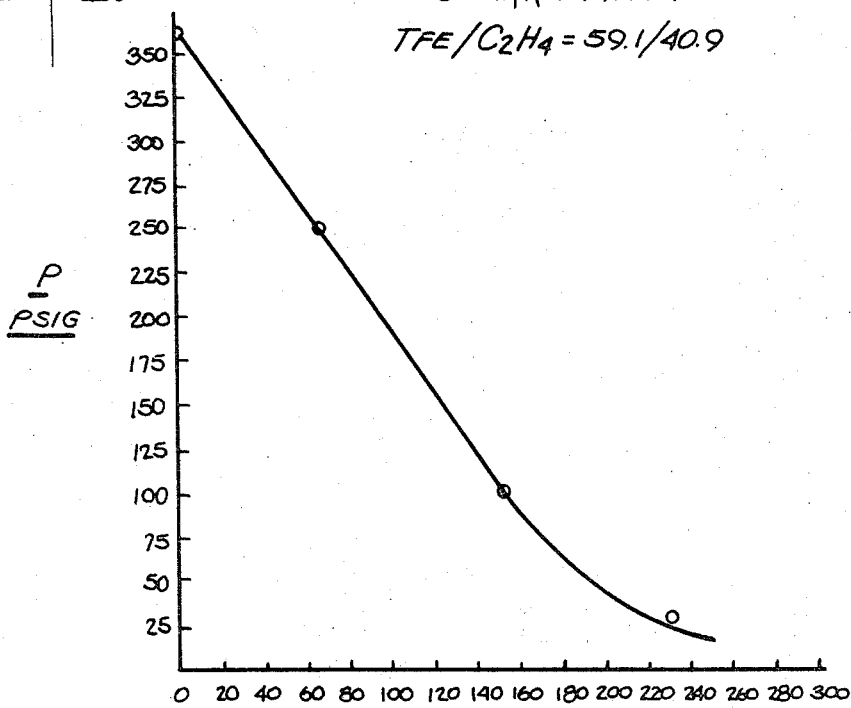
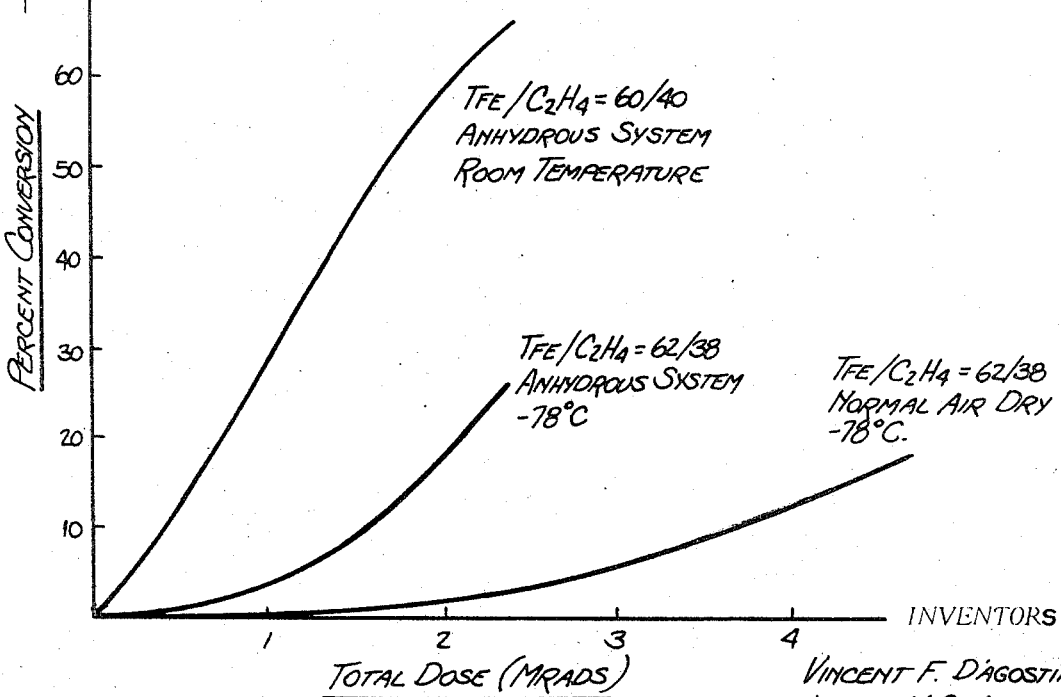

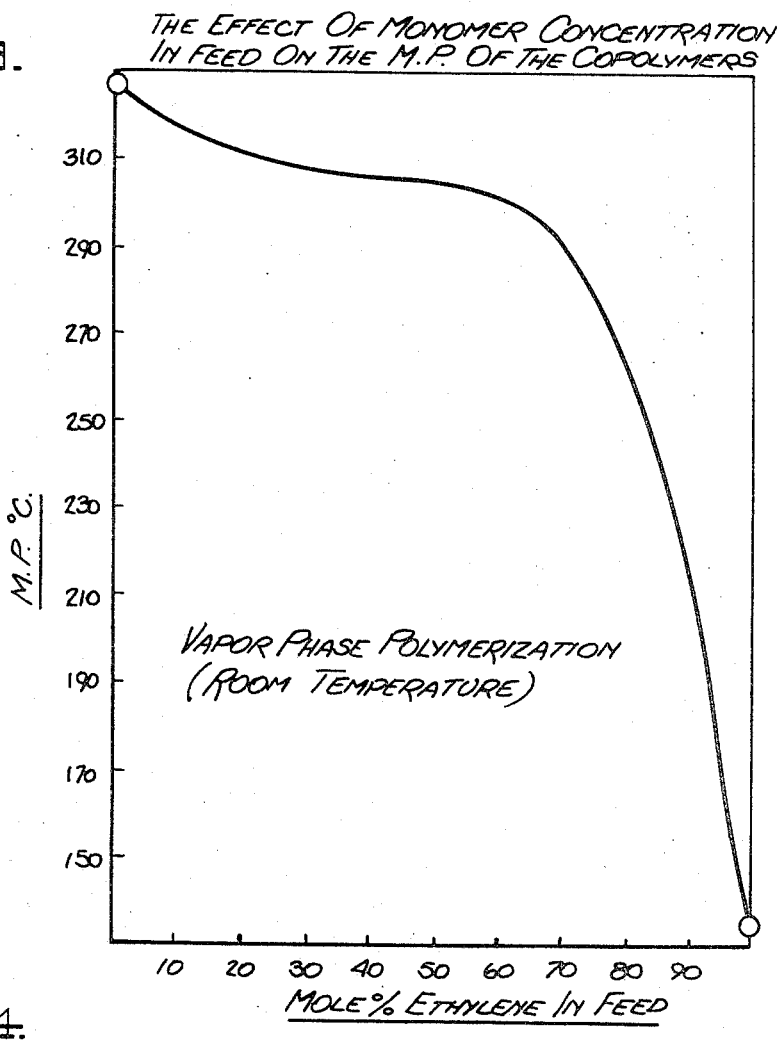
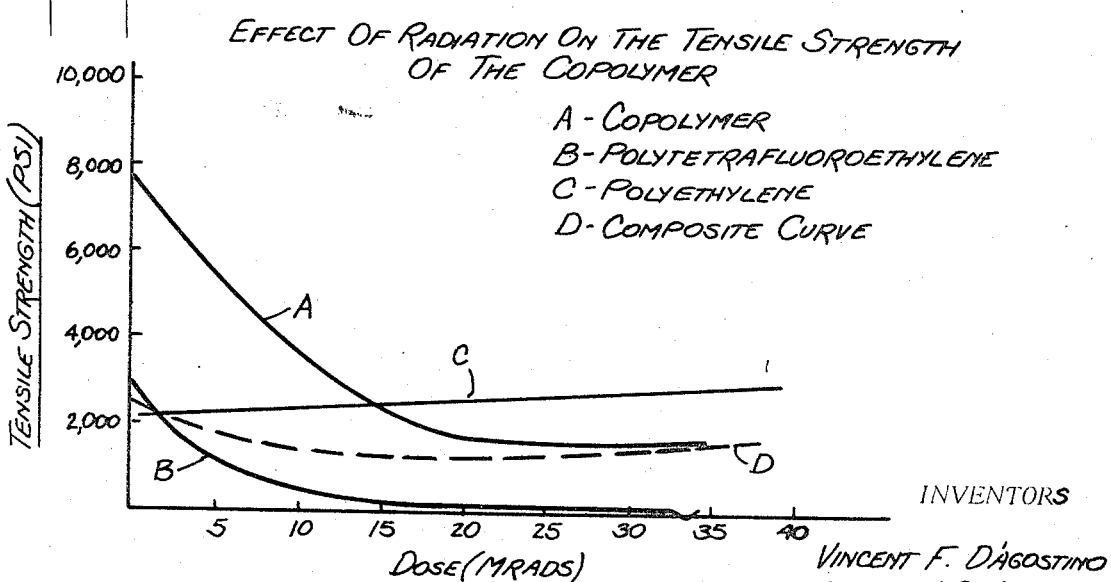

United States Patent Office 3,556,965
Patented Jan. 19, 1971

---

3,556,965
ANHYDROUS, IRRADIATION TETRAFLUORO-ETHYLENE-ETHYLENE COPOLYMERIZATION
Vincent F. D'Agostino, Huntington Station, and Joseph Y. C. Lee, Rego Park, N.Y., assignors to RAI Research Corporation, Long Island City, N.Y.
Filed Oct. 4, 1968, Ser. No. 765,109
Int. Cl. C08d 1/00; C08f 1/16
U.S. Cl. 204—159.22                     5 Claims

ABSTRACT OF THE DISCLOSURE

This disclosure is directed to the gas-phase, radiation-induced, copolymerization of tetrafluoroethylene with ethylene. For example, tetrafluoroethylene and ethylene are copolymerized at room temperature under anhydrous conditions. The resulting copolymer has excellent physical and chemical characteristics, and is particularly suitable as a dielectric material.

BACKGROUND

Polytetrafluoroethylene possesses outstanding heat and chemical resistance. It is also an excellent electrical insulator at high temperature; both the dielectric constant and dissipation factor are extremely low. However the polymer is lacking in stiffness, hardness, compressive strength, cold flow and radiation resistance, it tends not to flow at its melt point and is not a true thermoplastic. Because of this it cannot be molded by standard procedures such as injection molding or extrusion. Other fluoropolymers have advantages and disadvantages over polytetrafluoroethylene in certain areas, but in general do not exhibit the high temperature properties and chemical resistance of polytetrafluoroethylene. For these reasons copolymers of tetrafluoroethylene, for example, with ethylene, have been investigated and have been found to possess several advantages.

The copolymerization of ethylene with other ethylenically unsaturated monomers, is usually carried out in the liquid phase at high pressures and low temperatures in the presence of catalysts which yield free radicals. Tetrafluoroethylene is usually polymerized at elevated pressures and low temperatures in the presence of water with free radical initiators. In a preferred method water is used as a heat transfer medium with an inorganic peroxide catalysts, and high pressures are employed which increase the polymerization rate. Aqueous dispersion methods are preferred over mass polymerization, since the latter is hazardous because of the highly exothermic reaction.

The irradiation of polyethylene leads to cross linking (breakage of C—H bonds) whereas the irradiation of polytetrafluoroethylene leads to degradation (breakage of C—C bonds rather than splitting of the stronger C—F bonds). This latter fact has deterred the polymerization of tetrafluoroethylene by means of irradiation since the resultant polytetrafluoroethylene is of poor quality and uniformity, unless the irradiation dosage is of very low dosage which consequently also severely limits the yield.

THE INVENTION

This invention is directed to a method for the radiation-induced copolymerization of tetrafluoroethylene (TFE) with ethylene in the gas-phase and to the resultant copolymer. The copolymerization in the gas phase has been found to proceed to a high conversion. The percent of copolymer conversion was also greatly improved when anhydrous conditions were employed.

By the appended drawing FIG. 1 shows the relationship between pressure drop and time of irradiation and FIG. 2 shows the copolymerization of TFE/ethylene systems under various conditions.

Gas-phase copolymerization may be carried out from −70° C. to about 100° C., although room temperature, or from 0° C. to 60° C., is preferred. A total dose of from .05 to 15 mrads, or preferably .1 to 2 mrads, up to 10 mrads, is suitable. The copolymer composition is fairly independent of dose rate over a range of about .01 to at least .5 mrad per hour. With comparable total doses the percent conversion is higher at low dose rates of about .005 to 0.25 mrad per hour, with a dose rate of about 0.01 being preferred.

The physical properties of the copolymer are generally better than polytetrafluoroethylene or polyethylene. The tensile strength of the copolymer is almost double that of polytetrafluoroethylene. The percent elongation of the copolymer is about one-half that of polytetrafluoroethylene, which makes the copolymer a stiffer material. The Young's modulus was one order of magnitude higher than that of polytetrafluoroethylene, and the creep compliance was one order of magnitude lower than polytetrafluoroethylene. The thermal properties vary with the monomer feed, but a 1:1 copolymer has a melting range around 310° C. and is quite similar to tetrafluoroethylene. The dielectric constant of the copolymer is comparable to polytetrafluoroethylene and polyethylene throughout the frequency range tested. Chemically, the copolymer is also similar to polytetrafluoroethylene; no solvent has been found for it, and it is resistant to strong acids and alkalis. However, the fabrication characteristic of the copolymer is more like polyethylene rather than polytetrafluoroethylene. It can be molded into useful shapes by heat and pressure. The radiation resistance of the copolymer is intermediate between polytetrafluoroethylene and polyethylene. At very high radiation doses its tensile strength is probably due to its polyethylene character while at very low dose, it behaves like polytetrafluoroethylene.

In the preparation of the ethylene and tetrafluoroethylene copolymers the ethylene monomer (C.P. grade) was first purified by treatment with 30% aqueous KOH and 87% aqueous $H_2SO_4$. It was subsequently dried by passing through an acetone-dry ice trap at −78° C. Tetrafluoroethylene monomer (containing about 1% alpha-pinene inhibitor) was purified by passing through wash bottles containing an oxygen absorbent-chromous chloride solution and through a cold trap which was kept at about −60° C., above the freezing point of tetrafluoroethylene gas. After this procedure the monomers were collected in sampling tubes and subsequently polymerized in a pressure Parr Bomb of 0.6 liter capacity.

Under ordinary radiation conditions no effort is directed to the removal of moisture from the reaction system. In the present examples, great care was exercised to remove moisture from the system. A column of active silica gel, 10 cm. long was inserted before the sampling tubes. The system was evacuated to $10^{-2}$ mm. Hg for ½ hour, then by use of an oxygen-gas flame, the sampling tubes and pressure bomb were heated to a point just below the melting point of glass. The flaming was continued for about 15 minutes, followed by hot air heating at about 300° C. for another 15 minutes. The whole system, including the sampling tubes, pressure bomb, side arms and stop clocks, was also heated with a hot air heat gun and let cool to room temperature under vacuum.

Irradiations were performed employing a $Co^{60}$ source. After the irradiation was completed, the system was opened and the polymer was annealed under nitrogen at 200° C. for 6 hours before measurement of any properties.

The experimental conditions and results are summarized in the following table:

TABLE 1.—VAPOR STATE COPOLYMERIZATION OF TFE-ETHYLENE AT ROOM TEMPERATURE BY GAMMA RADIATION

| | TFE/$C_2H_4$ ratio | Dose rate (mrad/hr.) | Total dose (mrads) | Percent conversion | Percent F in copolymer | Molar ratio of TFE: $C_2H_4$ in copolymer |
|---|---|---|---|---|---|---|
| Experiment No.: | | | | | | |
| 1 | 51.9/48.1 | 0.00992 | 1.43 | *41.8, **54.5 | | |
| 2 | 59.1/40.9 | 0.00992 | 2.32 | *64.9, **91.6 | 56.80 | 1:1.21 |
| 3 | 78.4/21.6 | 0.00992 | 0.94 | *94.1, **100 | 58.40 | 1:1.12 |
| 4 | 39.1/60.9 | 0.00992 | 2.55 | *77.2, **49.2 | 53.99 | 1:1.46 |
| 5 | 20.6/79.4 | 0.00992 | 5.71 | *56.7, **42.7 | 46.82 | 1:2.22 |
| 6 | 4.5/95.5 | 0.00992 | 8.32 | *9.3, **12.5 | 43.26 | 1:2.72 |
| 7 | 66.6/33.3 | 0.00992 | 0.19 | **100 | (M.P., 305° C.) | |

*Assuming ideal gas behavior.
** Based on pressure drop of the system.

Experiment No. 2 was performed while carefully following the pressure drop of the system irradiated at room temperature. In FIG. 1 the pressure drop was plotted against the time of irradiation. This gave a very convenient way of measuring the extent of reaction and determination of the rate constants of the reaction. The percent polymer conversion based upon pressure difference in the system was 91% at 2.32 mrads. FIG. 1 is also a plot of the percent conversion as a function of time or dose.

$$\text{Percent conversion} = \frac{P_0 - P}{P_0} = \frac{360 - 30}{360} = 91.6\%$$

where $P_0$ is the initial pressure of the system and $P$ is the pressure of the system at any time, $t$. The pressure gauge was graduated in increments of 10 p.s.i., and the accuracy of reading is estimated at ±5 p.s.i.g. Elemental analysis revealed that the copolymer has almost a 1:1 TFE-ethylene ratio in the copolymer.

The above experimental procedures of Table I were repeated, with and without the precaution of maintaining anhydrous conditions, at −78° C. The conditions and results are presented in graphical form in FIG. 2, which also presents the comparable data from polymerization at room temperature. At −78° C. the ethylene is a gas and the tetrafluoroethylene is a liquid. A significant improvement in yield of copolymer was obtained in the copolymerization of tetrafluoroethylene at room temperature under anhydrous conditions. Copolymerization was easily achieved in the vapor state at room temperature, with a low total dose being suitable for good conversion.

In experiment No. 3 almost 100% conversion was achieved at a total dose of only 0.937 mrad, since at the end of irradiation, there was no pressure in the system. These vapor phase copolymerizations are possible at low doses when the experimental conditions are closely controlled. This is clearly illustrated in FIG. 2 where percent conversion is plotted as a function of dose. At comparable monomer feed, for an air dry system at −78° C., there was no radiation-induced polymerization after irradiation to 2 mrads. For an anhydrous system at −78° C. the percent conversion was about 20% at 2 mrads. For an anhydrous system at room temperature (vapor phase), the percent conversion was quite high, around 60%. These results demonstrate the importance of a dry system in the radiation-induced polymerization of TFE-ethylene, and also indicate the importance of temperature in increasing the percent conversion.

Although the percent polymer conversion shows an increase in the vapor phase copolymerization over the liquid-gas phase at −78° C., surprisingly the general behavior of the vapor phase system is similar in other respects to the liquid-gas system. For example, the percent conversion increases with an increase of the tetrafluoroethylene in the monomer feed and with an increase in total dose. The melting point of the copolymer produced via the vapor phase reaction also decreases with an increase in the ethylene concentration in the monomer feed. However, the reactivity ratio values indicate that in the vapor phase polymerization, the free radical of the tetrafluoroethylene unit reacts less readily with itself to form a homopolymer than with ethylene monomer. The rate of TFE radical reacts about $3 \times 10^3$ times larger with ethylene than with TFE monomer. By the same token, the rate of ethylene radical in the chain ends reacts less readily with ethylene monomer than with TFE monomer. Thus the vapor phase polymerization has distinct advantages over the corresponding low temperature polymerization. For example, a higher moleucular weight copolymer is obtained by the gas-phase polymerization. This results in a product which is more insoluble, with higher tensile strength and lower creep.

The TFE-ethylene copolymers prepared at room temperature are fluffy white materials and exhibit outstanding solvent resistance. No solvent has been found which dissolves the copolymer at room temperature. At very high temperatures, close to the melting point of the copolymers (ca. 300° C.) Kel-F oil effects solution. In this respect, the copolymer behaves like polytetrafluoroethylene. Also its thermal properties are very interesting. The melting point of the copolymer gradually decreases with an increase in the ethylene content in the feed composition up to 70% ethylene. Beyond this ethylene concentration the melting point decreases abruptly as shown in FIG. 3. It is of significance to note that the melting points of the copolymers yield a smooth curve. Based on this finding it is possible to vary at will the thermal properties of the copolymer, from the melting point of polytetrafluoroethylene to that of polyethylene.

The copolymer has a density range from 1.73 to 1.75. This density is between the density of polytetrafluoroethylene 2.25 and polyethylene 0.935, as would be expected for a copolymer of these two monomers. However, the mechanical properties such as tensile strength and creep compliance are not intermediate between polytetrafluoroethylene and polyethylene as might be expected. The average tensile properties of the copolymer are given in Table 2.

TABLE 2.—RESULTS OF TENSILE TEST

| Copolymer | Tensile strength (p.s.i.) | Elongation (percent) | Young's modulus |
|---|---|---|---|
| Experiment: | | | |
| 2-a | 10,493 | 183.4 | $2.2 \times 10^5$ |
| 2-b | 6,096 | 73.3 | $2.1 \times 10^5$ |
| 2-c | 8,333 | 97.0 | $9.56 \times 10^5$ |
| 2-d | 6,988 | 104.2 | $2.1 \times 10^5$ |
| Average | 7,977.5 | 114.5 | $3.99 \times 10^5$ |
| Polytetrafluoroethylene: | | | |
| No. 1 | 4,412 | 259.1 | $3.4 \times 10^4$ |
| No. 2 | 4,064 | 239.1 | $2.9 \times 10^4$ |
| No. 3 | 4,171 | 246.6 | $2.8 \times 10^4$ |
| Average | 4,215 | 248.4 | $3.03 \times 10^4$ |

The average tensile strength at break of the copolymers of experiment 2, reported above, was 7977.5, as compared to 4215 p.s.i. for Teflon and 1000–5000 p.s.i. for polyethylene. The average elongation at break of the copolymer was 114.5 as compared to 248% for polytetrafluoroethylene and 15–800% for polyethylene. Young's modulus for the copolymer was $3.99 \times 10^5$ p.s.i. as compared to $3.0 \times 10^4$ p.s.i. for Teflon and $1.4 \times 10^4$ p.s.i. for polyethylene. It is possible to explain this anomalous behavior of the copolymer by assuming strong hydrogen bonding effects between the hydrogen and fluorine atoms of the copolymer. No such hydrogen bonding is possible in polytetrafluoroethylene or polyethylene. Since the molecules of the copolymer are oriented along the axis of pull in the tensile tester, crystallinity is induced in addition to hydrogen bonding formation. This should also lead to an increase in the tensile strength. Additional force is necessary to break these intramolecular forces of attraction. The net results are reflected in tensile strength and Young's modulus.

Since polytetrafluoroethylene exhibits cold flow and defromation under load, a creep measurement is considered significant in comparing the behavior of the copolymer and polytetrafluoroethylene. For polytetrafluoroethylene, the compliance is higher at higher temperatures than at low temperature. This is expected, since creep is a measure of the response of the material under constant load. To elongate, the segments of the polymeric chain must be displaced; however, they experience a retarding viscous force. At low temperature this viscous force is large, so that the polymeric chains experience a larger viscous force retarding the elongation than at higher temperatures. The creep measurement of the copolymer of experiment 2 was performed at five temperatures (from 200° F. to 325° F.), and it was found that the creep compliance of the copolymer is one order of magnitude less than that of polytetrafluoroethylene. The copolymer, therefore, has less deformation under load or better cold flow resistance. It should be noted that polyethylene at 225° F. would melt and have infinite creep.

Polytetrafluoroethylene is known to be one of the most inert polymers towards heat, solvents and most corrosive chemicals. In contrast, it is extremely sensitive to radiation and suffers damage which is reflected as a loss in mechanical strength even after irradiation to as little as 0.1 mrad. Thus, it is reported in the literature that the threshold dose for mechanical breakdown is in the order of $5 \times 10^4$ rads and that the tensile strength of polytetrafluoroethylene falls to about one-half its unirradiated value at a dose of only 1 mrad. The explanation offered is that polytetrafluoroethylene undergoes main-chain degradation when irradiated. The environment in which the radiation is performed also exerts an important effect. The radiation characteristic of the copolymer was investigated together with polytetrafluoroethylene as a reference, under a nitrogen atmosphere using $Co^{60}$. The results are given in Table 3.

TABLE 3.—EFFECT OF RADIATION ON THE TENSILE PROPERTIES OF COPOLYMERS

| Sample No. | Dose received (mrads) | Tensile at break (p.s.i.) | Elongation at break (1%) |
| --- | --- | --- | --- |
| Copolymer* No.: | | | |
| 1 | 0 | 7,877 | 122 |
| 2 | 1.65 | 6,028 | 150 |
| 3 | 6.43 | 5,621 | 181 |
| 4 | 16.63 | 1,968 | 109 |
| 5 | 33.08 | 1,877 | 106 |
| Polytetrafluoroethylene No.: | | | |
| 1 | 0 | 2,995 | 219 |
| 2 | 1.65 | 1,497 | 6.3 |
| 3 | 16.63 | **0 | |
| 4 | 33.08 | 0 | |

*All copolymers were made by the procedure of experiment 2, Table I.
**Sample has no strength, crumples during handling.

These results are based on testing of samples at least in duplicate. Polytetrafluoroethylene crumples after a dose of 16.63 mrads. The tensile strength of the copolymer falls initially with increase in total dose of radiation, but levels off as the dose is further increased. It retains a tensile strength of close to 2000 p.s.i. after 33 mrads. This is illustrated in FIG. 4. Although the copolymer undergoes some degradation under radiation, as is characteristic of fluoropolymers, the copolymer also contains ethylene units, which gives rise to crosslinking. This accounts for the levelling off of the tensile strength with increase in dose, and provides an improved copolymer which is radiation resistant after the initial dose, and has improved thermal properties and decreased cold flow.

The dielectric properties of the TFE-ethylene copolymers are presented in Table 4. The dielectric constants are essentially independent of frequencies. The use of a low radiation dose to effect polymerization is desirable since the dielectric constant and loss factor is lowered.

TABLE 4.—COMPARISON OF DIELECTRIC PROPERTIES

| Properties | Polytetrafluoroethylene | Copolymer | Polyethylene |
| --- | --- | --- | --- |
| Dielectric constant 60 c.p.s. | 2.1 | 2.5 | 2.3 |
| $10^3$ c.p.s. | 2.1 | 2.5 | 2.3 |
| $10^6$ c.p.s. | 2.1 | 2.1 | 2.3 |
| $10^8$ c.p.s. | | 2.1 | |

The TFE-ethylene copolymers of this invention are obtained as ultra small particles which can be molded, or molded as continuous non-porus sheets and/or made into microporous sheets. A one-inch diameter disc was prepared by placing about 2 grams of copolymer into a mold and applying 5000 lbs. pressure while heating. When the temperature reached between 320 to 350° C., the load was decreased to about 3000 lbs. Heating at 3000 lbs. pressure was continued for one-half hour. The mold was then cooled while maintaining a 5000 lb. load. In this way, satisfactory discs were made under vacuum. In molding sheets, no vacuum was used, and the load applied was as high as 15000 lbs.

Copolymers have been successfully molded into sheets (2 mil and 5 mil thick) and discs. Some yellowish stains remain on the molded sections after they have been pressed. These samples have been cleaned to give a colorless product. The copolymer can be molded into useful shapes by heat and pressure. The molding temperature varies from the melting point of the copolymer (FIG. 3) up to 360° C. with a preferred range of about 330–350° C. Thus, an advantage of the copolymers of this invention is the ability to extrude them into films, to form objects by injection molding, and to heat seal the copolymers at elevated temperatures.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed:

1. The method which comprises copolymerizing tetrafluoroethylene with ethylene by irradiation in the gas phase under anhydrous conditions and wherein said irradiation is with a dose rate of between about .005 to .5 mrad per hour and a total dose of from about .1 to 15 mrad.

2. The method of claim 1 which comprises copolymerizing at from 0° C. to 60° C.

3. The method of claim 1 which comprises mixing anhydrous tetrafluoroethylene and anhydrous ethylene in a closed reaction vessel, irradiating said mixture with a dose rate of between about .005 to .5 mrad per hour and a total dose of from .1 to 15 mrad, at a temperature of from —20° C. to 100° C., removing the resultant copolymer and molding it at an elevated temperature and pressure.

4. In the method of copolymerizing tetrafluoroethylene in a polymerization system, the steps which comprise: purifying said tetrafluoroethylene and ethylene to obtain anhydrous reactants; treating said polymerization system to remove any moisture therefrom; passing said reactants into said polymerization system; and irradiating said reactants in the gas phase under anhydrous conditions wherein said irradiation is with a dose rate of between about .005 to .5 mrad per hour and a total dose of from about .1 to 15 mrad.

5. The method of claim 1 which comprises mixing tetrafluoroethylene and ethylene, irradiating said mixture with a dose rate of between about .005 to .5 mrad per hour and a total dose of .1 to 15 mrad, at a temperature of from −20° C. to 100° C. to form a copolymer and irradiating the resultant copolymer with a total dose of at least 15 mrad.

References Cited

UNITED STATES PATENTS

| | | | |
|---|---|---|---|
| 2,471,959 | 5/1949 | Hunt | 260—89.5 |
| 3,058,899 | 10/1962 | Yanko et al. | 204—159.22 |

SAMUEL H. BLECH, Primary Examiner

R. B. TURER, Assistant Examiner

U.S. Cl. X.R.

204—159.22; 260—87.5